US012616107B2

(12) United States Patent (10) Patent No.: US 12,616,107 B2
Littlefield et al. (45) Date of Patent: May 5, 2026

(54) SEAWEED SEEDERS AND METHODS FOR USING THEM

(71) Applicant: Woods Hole Oceanographic Institution, Woods Hole, MA (US)

(72) Inventors: Robin Littlefield, Woods Hole, MA (US); Scott Lindell, Woods Hole, MA (US); David Bailey, Woods Hole, MA (US); Benjamin Weiss, Woods Hole, MA (US)

(73) Assignee: Woods Hole Oceanographic Institution, Woods Hole, MA (US)

( * ) Notice: Subject to any disclaimer, the term of this patent is extended or adjusted under 35 U.S.C. 154(b) by 83 days.

(21) Appl. No.: 18/835,942

(22) PCT Filed: Dec. 11, 2023

(86) PCT No.: PCT/US2023/083381
§ 371 (c)(1),
(2) Date: Aug. 5, 2024

(87) PCT Pub. No.: WO2024/129593
PCT Pub. Date: Jun. 20, 2024

(65) Prior Publication Data
US 2025/0143242 A1 May 8, 2025

Related U.S. Application Data

(60) Provisional application No. 63/431,843, filed on Dec. 12, 2022.

(51) Int. Cl.
*A01G 33/00* (2006.01)
*B63G 8/00* (2006.01)

(52) U.S. Cl.
CPC ............. *A01G 33/00* (2013.01); *B63G 8/001* (2013.01)

(58) Field of Classification Search
None
See application file for complete search history.

(56) References Cited

U.S. PATENT DOCUMENTS 4,713,896 A * 12/1987 Jennens ................. B63H 19/08
37/313
4,899,489 A * 2/1990 Shishkin ................ A01G 31/02
47/17
(Continued)

FOREIGN PATENT DOCUMENTS

CN 117546660 A * 2/2024
KR 82-1519 7/1982
(Continued)

*Primary Examiner* — Morgan T Jordan
(74) *Attorney, Agent, or Firm* — Kean Miller LLP; Robert Devin Ricci; Lauren J. Rucinski

(57) ABSTRACT

Seaweed seeders that can deposit seaweed directly along a grow-line or other grow structure are disclosed herein. In a specific embodiment, the seaweed seeder includes: a bracket; at least one cap member, where the at least one cap member is connected to the bracket; at least one motor, at least one propeller, where the at least one propeller is connected to the at least one motor; at least one main housing, where the at least one main housing includes a length, an outer surface, an inner surface, and an interior space, and where the at least one main housing is connected to the at least one cap member; at least one electronic controller, where the at least one electronic controller is positioned in the interior space of the main housing, where at least one electronic controller is in electronic communication with the at least at least one motor; and an attaching member.

15 Claims, 8 Drawing Sheets

(56)         References Cited

U.S. PATENT DOCUMENTS

| | | | |
|---|---|---|---|
| 10,709,078 B2 | 7/2020 | Kati et al. | |
| 2003/0019131 A1* | 1/2003 | Anderson | E02F 3/4131 |
| | | | 37/184 |
| 2003/0221598 A1* | 12/2003 | Anderson | A01C 11/003 |
| | | | 111/101 |
| 2005/0034641 A1* | 2/2005 | Anderson | A01C 11/003 |
| | | | 111/200 |
| 2015/0101519 A1* | 4/2015 | Blackwell | G05D 1/0246 |
| | | | 172/2 |
| 2022/0071092 A1 | 3/2022 | Goul et al. | |
| 2023/0157230 A1* | 5/2023 | Knoll | A01D 44/00 |
| | | | 47/59 R |
| 2023/0380361 A1* | 11/2023 | Plöchinger | A01G 7/045 |
| 2024/0114822 A1* | 4/2024 | Radding | A01C 11/003 |
| 2024/0260528 A1* | 8/2024 | von Herzen | A01G 33/00 |

FOREIGN PATENT DOCUMENTS

| | | | |
|---|---|---|---|
| KR | 10-1525755 | | 6/2015 |
| KR | 20150084052 A | * | 7/2015 |
| KR | 102367914 B1 | * | 2/2022 |
| WO | WO 2018/070871 A1 | | 4/2018 |

* cited by examiner

SEAWEED SEEDERS AND METHODS FOR USING THEM

CROSS-REFERENCE TO RELATED APPLICATIONS

This application is a 35 USC § 371 National Stage application of International Application No. PCT/US23/83381 filed 11 Dec. 2023, now pending which claims the benefit under 35 USC § 119 (e) to U.S. Application Ser. No. 63/431,843, filed Dec. 12, 2022. The disclosure of each of the prior applications is considered part of and is incorporated by reference in the disclosure of this application.

BACKGROUND

Field

Provided herein are seaweed seeders that automate the wrapping of a seed-line around a grow-line while traversing the grow-line for efficient planting of seaweed farms.

Description of the Related Art

The mariculture industry is rapidly expanding around the world. As mariculture farms become larger and more complex, new methods of farming are needed to maintain economic viability. For mariculture farmers to enter new markets, such as biofuel, bioplastics, and carbon credits, the cost of production needs to drop significantly. For seaweed farmers, one of the largest costs is labor. Current methods of transferring seed-line from the nursery to the seaweed farm have drawbacks. For example, wrapping the seed-line around the grow-line requires that the grow-line be unfastened at its end from the farm infrastructure to pass spools over the grow-line. A boat is then used to traverse the grow-line while the farmer manually pulls the grow-line out of the water and wraps the seed-line around the grow-line. Once at the end, the grow-line is again detached, and the empty seed spool is removed from the line and the grow-line is reattached to the farm infrastructure. The method is then repeated for each grow-line of the farm. The method is labor intensive and exposes the juvenile seaweed to the air for long periods of time. The juvenile seaweed is especially sensitive to adverse weather conditions: low temperatures, wind chill, and rain.

Consequently, there is a need for new seaweed seeders and methods that can wrap a seed-line around a grow-line without having to unfasten the grow-line from the farm infrastructure or having to manually lift the grow-line and wrap the seed-line.

SUMMARY

Disclosed herein are seaweed seeders that can wrap seaweed seed-lines around a grow-line while traversing the grow-line. In a specific embodiment, the seaweed seeder includes: a bracket; at least one cap member, where the at least one cap member is connected to the bracket; at least one motor, at least one propeller, where the at least one propeller is connected to the at least one motor; at least one main housing, where the at least one main housing includes a length, an outer surface, an inner surface, and an interior space, and where the at least one main housing is connected to the at least one cap member; at least one electronic controller, where the at least one electronic controller is positioned in the interior space of the main housing, where at least one electronic controller is in electronic communication with the at least at least one motor; and an attaching member.

In another specific embodiment, a method for using a seaweed seeder includes: attaching a seaweed seeder to a grow-line, where the seaweed seeder includes: a bracket; at least one cap member, where the at least one cap member is connected to the bracket; at least one motor, at least one propeller, where the at least one propeller is connected to the at least one motor; at least one main housing, where the at least one main housing includes a length, an outer surface, an inner surface, and an interior space, and where the at least one main housing is connected to the at least one cap member; at least one electronic controller, where the at least one electronic controller is positioned in the interior space of the main housing, where at least one electronic controller is in electronic communication with the at least at least one motor; and an attaching member; and activating the at least one motor to engage the at least one propeller to move seaweed seeder along the grow-line.

BRIEF DESCRIPTION OF THE DRAWINGS

For the purposes of promoting an understanding of the principles of the present disclosure, reference is now made to the embodiments illustrated in the drawings, which are described below. The embodiments disclosed herein are not intended to be exhaustive or limit the present disclosure to the precise form disclosed in the following detailed description. Rather, the embodiments are chosen and described so that others skilled in the art can utilize their teachings. Therefore, no limitation of the scope of the present disclosure is thereby intended.

DETAILED DESCRIPTION

Figure 1:
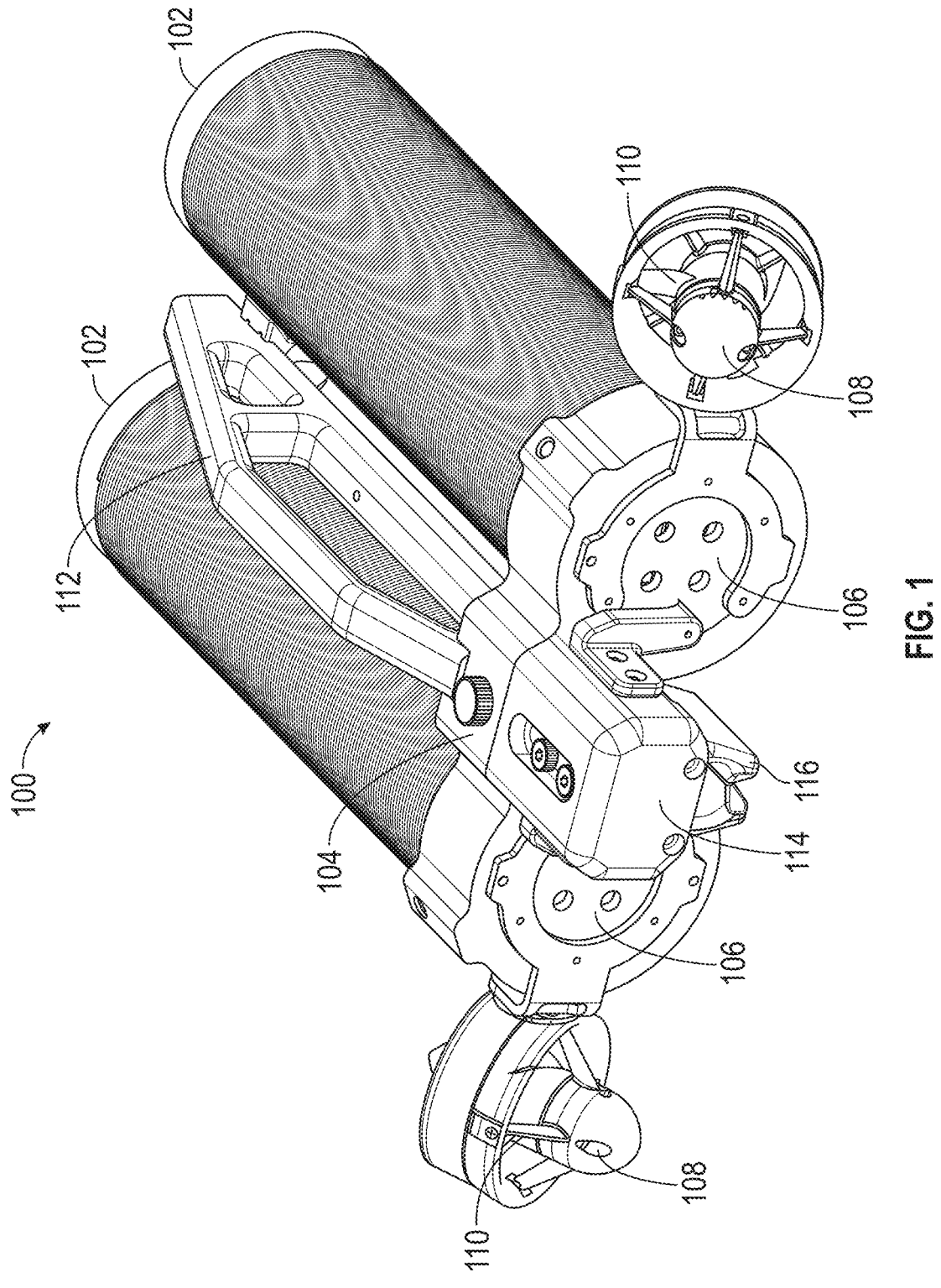
FIG. 1 is a perspective view of an embodiment of a seaweed seeder 100 with two main housings 202.

The seaweed seeder can allow the seed-line spools to transit the length of the grow-line 608 while wrapping seed-line around the grow-line without the need for a boat or for unfastening the grow-line from the farm infrastructure. The seaweed seeders can provide non-disruptive attachment and detachment to grow-lines and automated wrapping of the seed-line around the grow-line, allowing the farmers to seed much faster than traditional methods and with a substantial reduction in labor required to seed a farm. The seaweed seeder can also reduce the number of blank sections commonly found on grow-lines due to the limitations of the traditional seeding method, such as the weather and chaffing of the boat. The seaweed seeders can also lessen the time the seed spool spends in the air, reducing the time of exposure to the elements and, thereby, increasing seedling survivability. Eliminating or reducing the above the water surface activities from traditional seeding method can increase the weather window in which seeding can occur and can maximize yields. The use of multiple seaweed seeders can reduce the number of boat trips back and forth along the length of the farm for a greater savings in time, fuel, and reduced wear on equipment.

In one or more embodiments, the components for the seaweed seeder can include, but are not limited to: one or more main housings, one or more brackets, one or more battery housings, one or more batteries, one or more seed-lines, one or more attachment members, one or more capture jaws, one or more grow-line guides, one or more grow-lines, one or more pins, one or more handles, one or more electronic controllers, one or more spool members, one or more seed spools, one or more thrusters, one or more propellers, one or more actuators, one or more switches, one or more sensors, one or more wires, and one or more caps. In one or more embodiments, the one or more components of the seaweed seeder can be connected to and/or integrally formed with any other of the one or more components.

The seaweed seeder and any of its components can be made from one or more suitable materials. For example, the one or more components of the seaweed seeder can made from one or more of the materials selected from the list: metals (such as aluminum, steel, stainless steel, brass, nickel), metal alloys, concretes, fiberglass, wood, composite materials (such as ceramics, wood/polymer blends, cloth/polymer blends, etc.), and plastics (such as polyethylene, polypropylene, polystyrene, polyurethane, polyethylethylketone (PEEK), polytetrafluoroethylene (PTFE), polyamide resins (such as nylon 6 (N6), nylon 66 (N66)), polyester resins (such as polybutylene terephthalate (PBT), polyethylene terephthalate (PET), polyethylene isophthalate (PEI), PET/PEI copolymer) polynitrile resins (such as polyacrylonitrile (PAN), polymethacrylonitrile, acrylonitrile-styrene copolymers (AS), methacrylonitrile-styrene copolymers, methacrylonitrile-styrene-butadiene copolymers; and acrylonitrile-butadiene-styrene (ABS)), polymethacrylate resins (such as polymethyl methacrylate and polyethylacrylate), cellulose resins (such as cellulose acetate and cellulose acetate butyrate); polyimide resins (such as aromatic polyimides), polycarbonates (PC), elastomers (such as ethylene-propylene rubber (EPR), ethylene propylene-diene monomer rubber (EPDM), styrenic block copolymers (SBC), polyisobutylene (PIB), butyl rubber, neoprene rubber, halobutyl rubber and the like)), and mixtures, blends, or copolymers of any and all of the foregoing materials.

Figure 2:
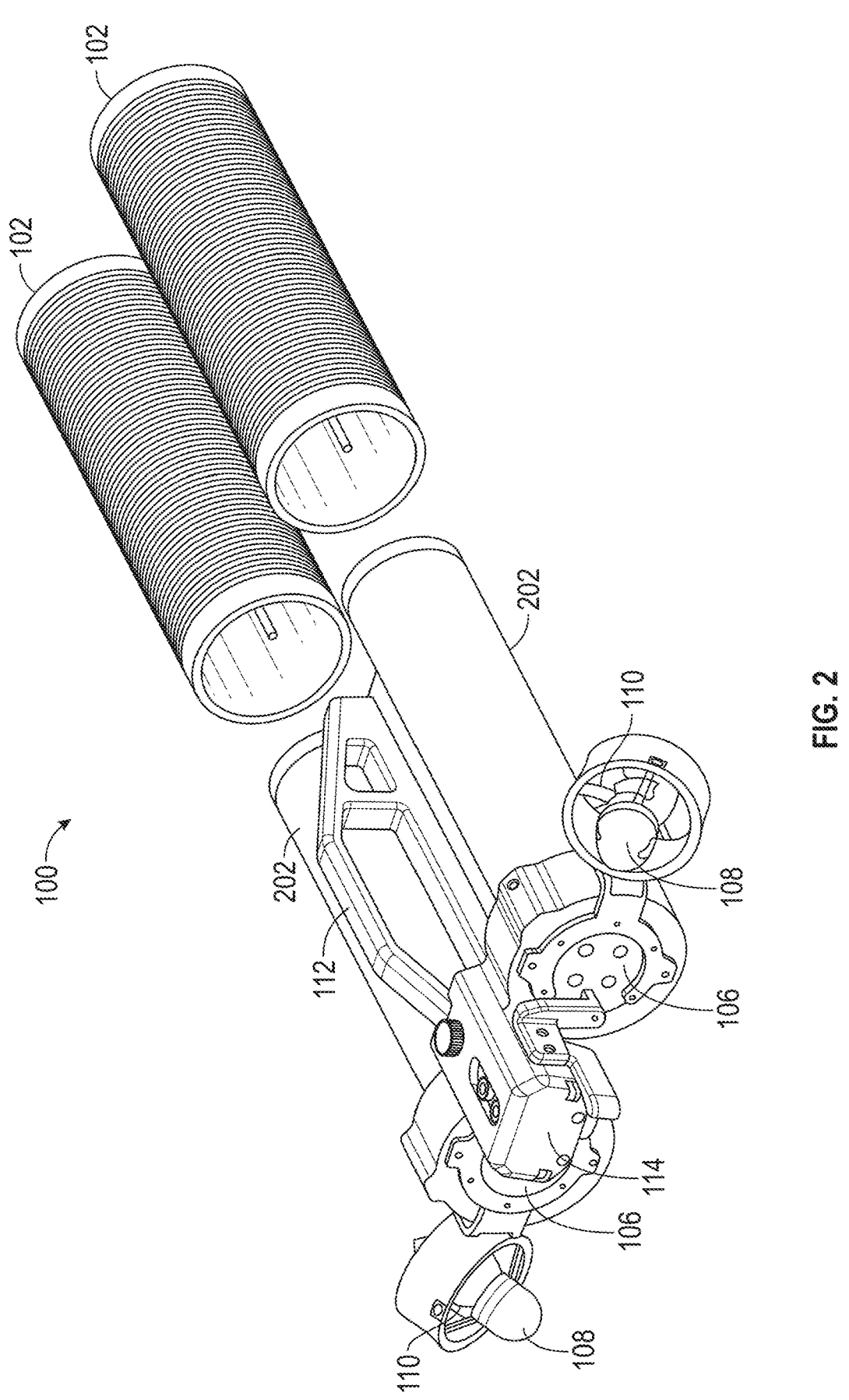
FIG. 2 is a perspective view of an embodiment of a seaweed seeder 100 with two main housing 202 showing how the seed spool 102 can be positioned on the main housing 202.
Figure 3:
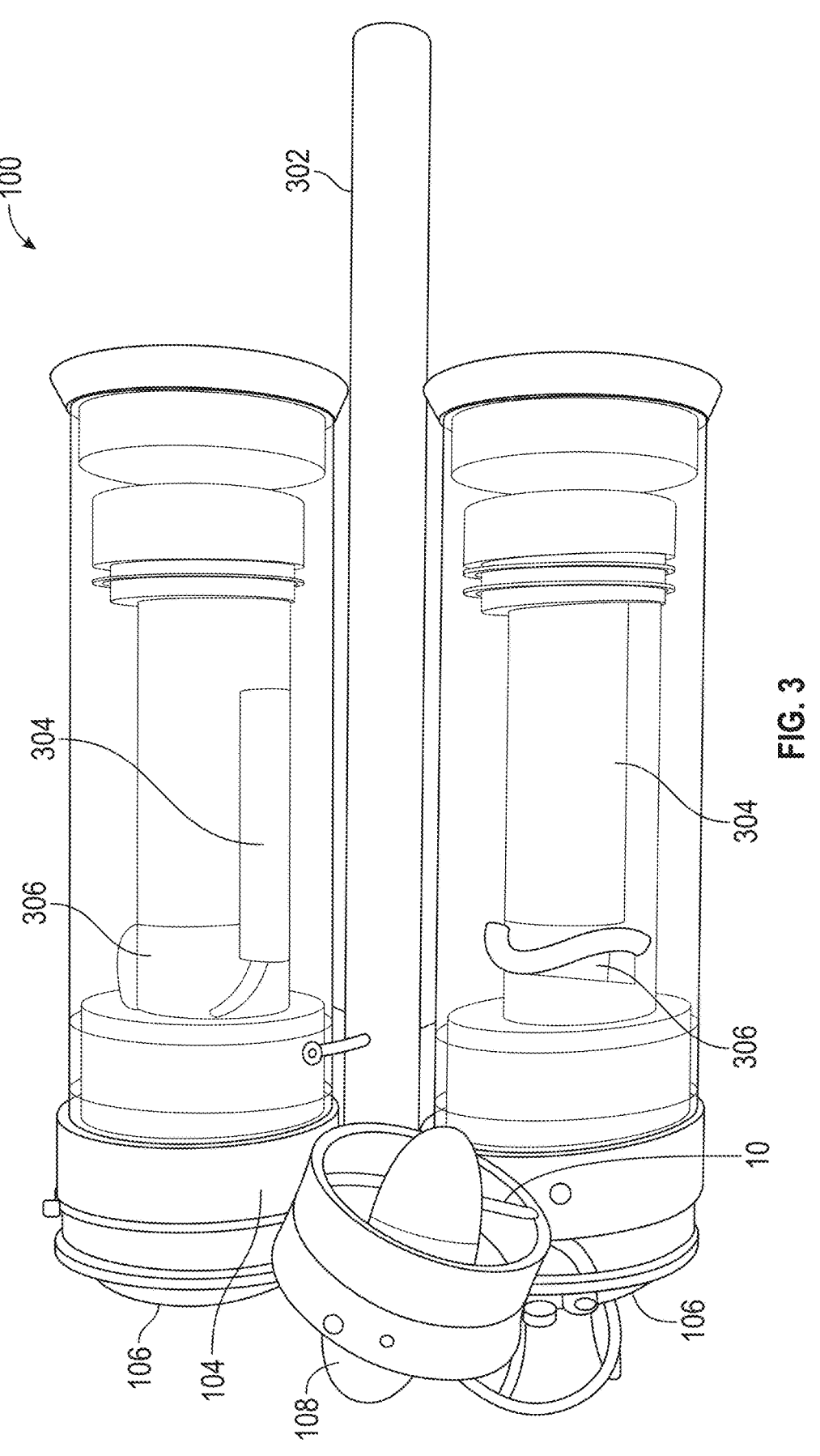
FIG. 3 is top view of an embodiment of a seaweed seeder 100 with two transparent main housings 202.
Figure 4:
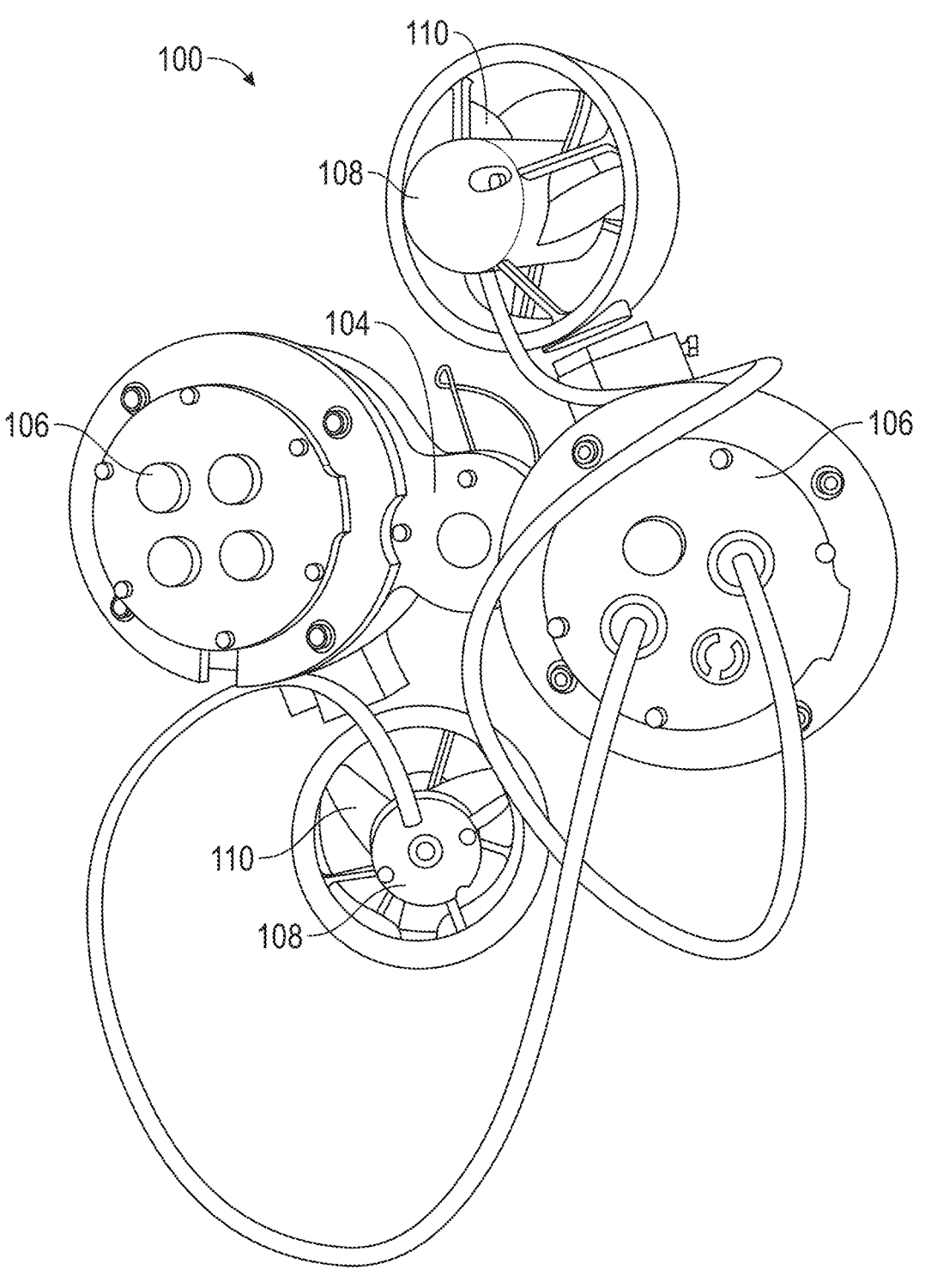
FIG. 4 is front view of an embodiment of a seaweed seeder 100 with two main housings 202.

FIGS. 1-4 depicts an embodiment of the seaweed seeder 100 with two main housings that are parallel to each other. FIG. 1 shows two seed spools 102 are positioned on the two main housings (positioned under the seed spools). The seaweed seeder 100 has a bracket 104 connected to two caps 106, which are connected to two main housings. The cap members 106 are connected to two motors 108 and two propellers 110, which can provide propulsion to the seaweed seeder 100. The bracket 104 is connected to a handle 112. In operation, the user can move the seaweed seeder 100 by the handle 112. The bracket 104 is connected to an auto-stop actuator 114. The bracket 104 is connected to an attaching member 116. In operation, the attaching member 116 can be used to attach the seaweed seeder 100 to the grow-line so the seaweed seeder 100 can traverse the grow-line depositing the seed-line from the seed spools 102 along the grow-line. In operation, when the seaweed seeder 100 traverses to the end of the grow-line the auto-stop actuator 114 can be triggered to stop the seaweed seeder 100 by disengaging the motor 108. FIG. 2 depicts an embodiment of a seaweed seeder 100 with two main housings 202 showing how the seed spools 102 can be positioned on the main housings 202. FIG. 3 depicts an embodiment of a seaweed seeder 100 with two transparent main housings 202. Between the two transparent main housing 202 is positioned a grow-line guide 302. Inside the transparent main housings are positioned the battery housing 304, and electronic controller 306. In FIG. 3, the angle of the propeller in relation to main housings 202 can be seen. FIG. 4 depicts a front side view of an embodiment of a seaweed seeder 100 with two main housings 202.

Figure 5:
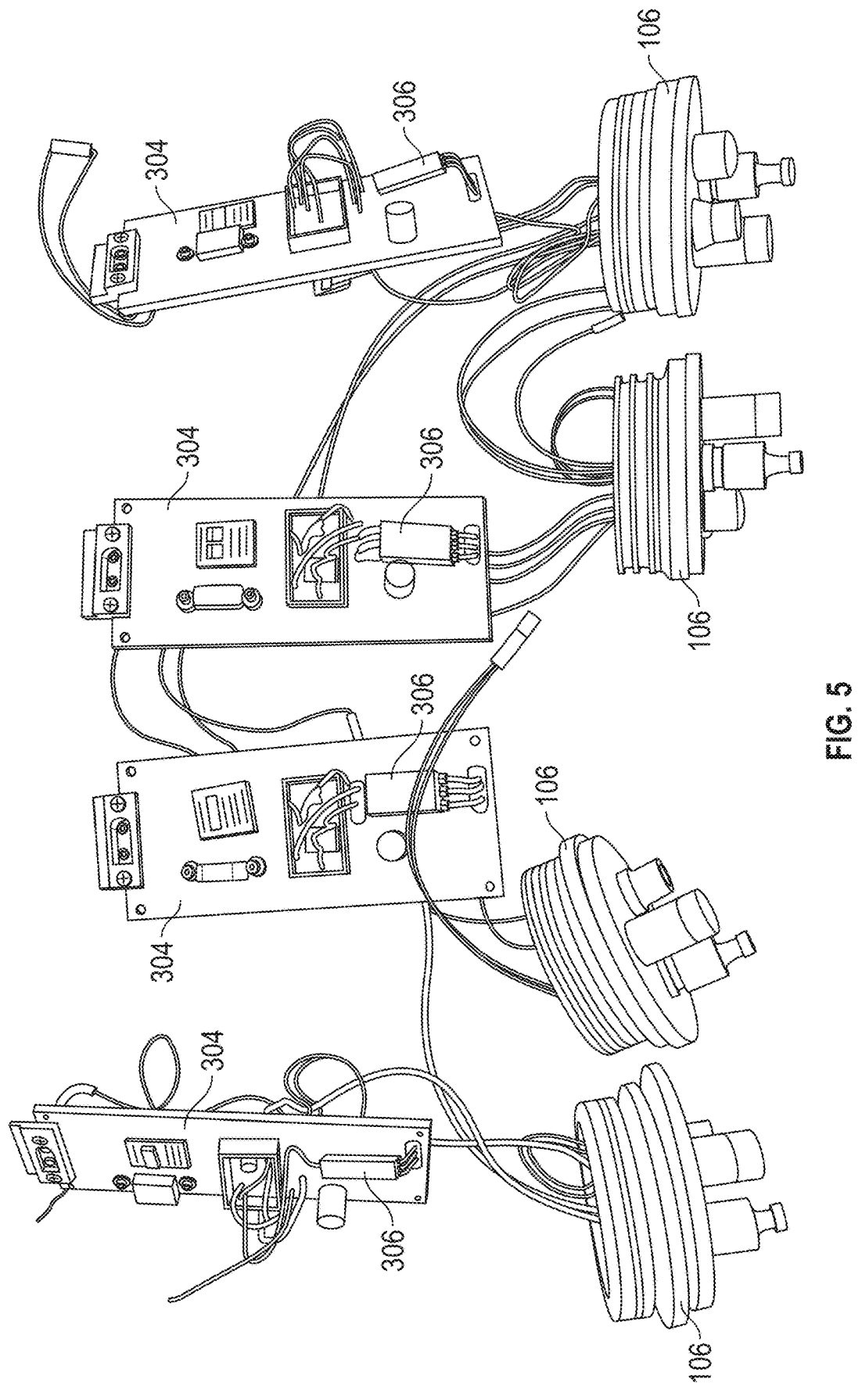
FIG. 5 is an embodiment of four cap members 106 with four electronic controllers 306 and four battery housings 304.

FIG. 5 depicts an embodiment of the four cap members 100 with four battery housings 304, and four electronic controllers 306.

Figure 6:
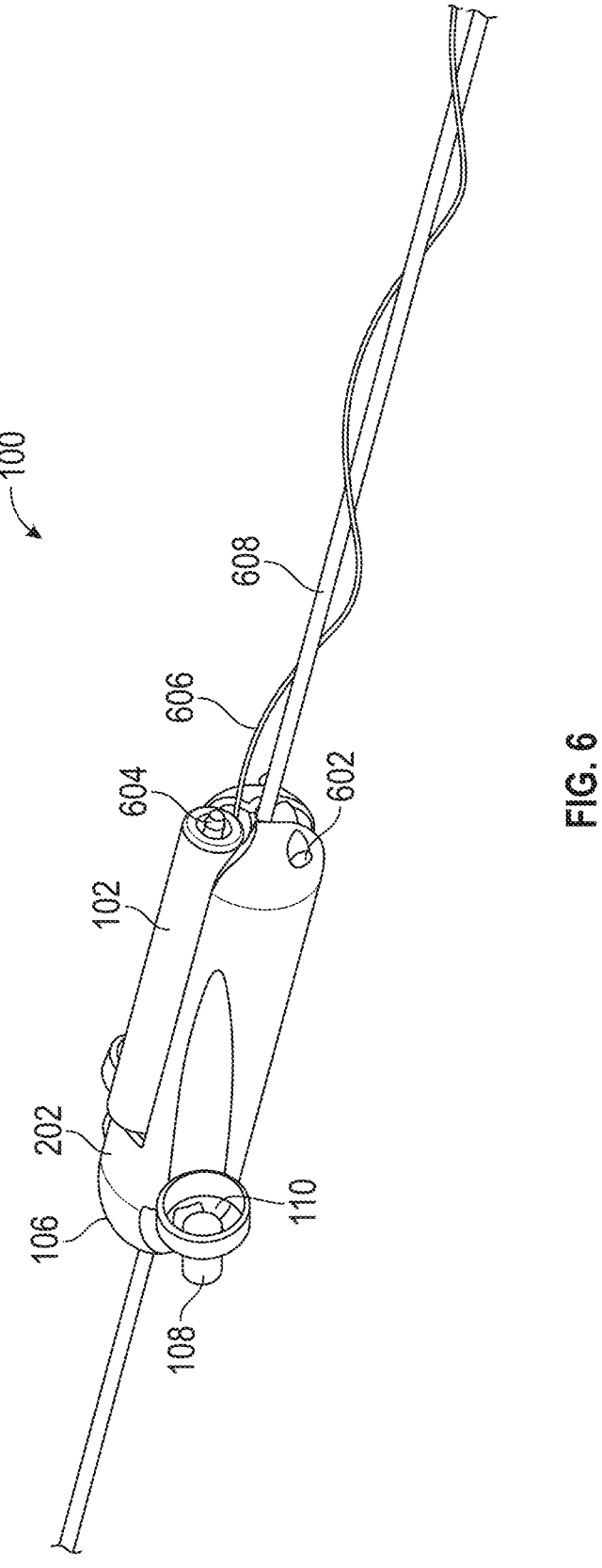
FIG. 6 is a perspective view of an embodiment of a seaweed seeder 100 with one main housing 202.

FIG. 6 is a perspective view of an embodiment of a seaweed seeder 100 with one main housing 202. The bracket 104 is connect to a spool member 604, which holds the seed-line 606. The main housing 202 is connected to a pin 602. The seaweed seeder 100 can be attached to a grow-line 608 using the pin 602. In operation, as the seaweed seeder 100 traverses the grow-line 608 the seed-line 606 unwinds from the spool member 604.

Figure 7:
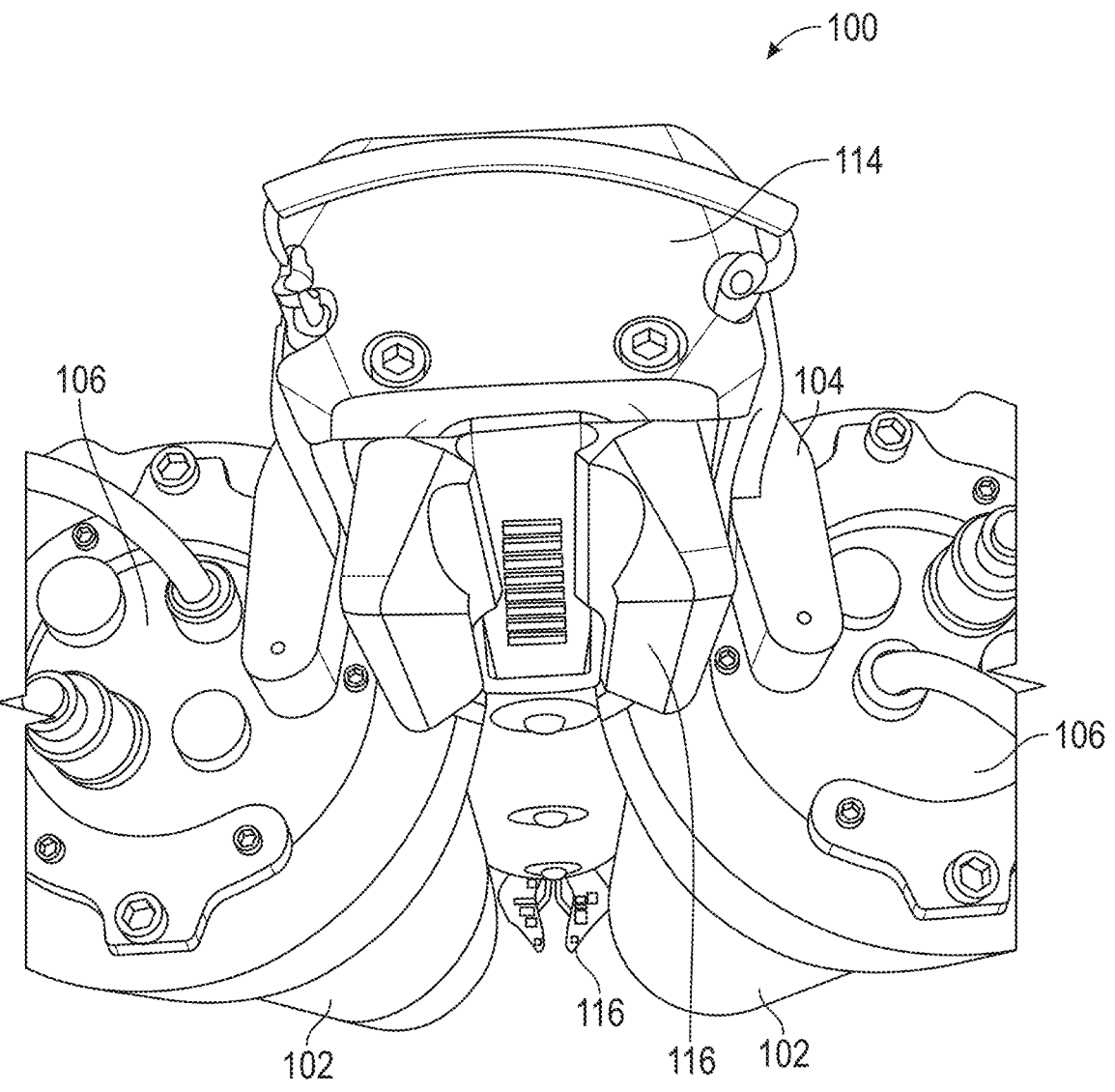
FIG. 7 is a perspective view of an embodiment of a seaweed seeder 100 showing the capture jaws 702 in the open position.
Figure 8:
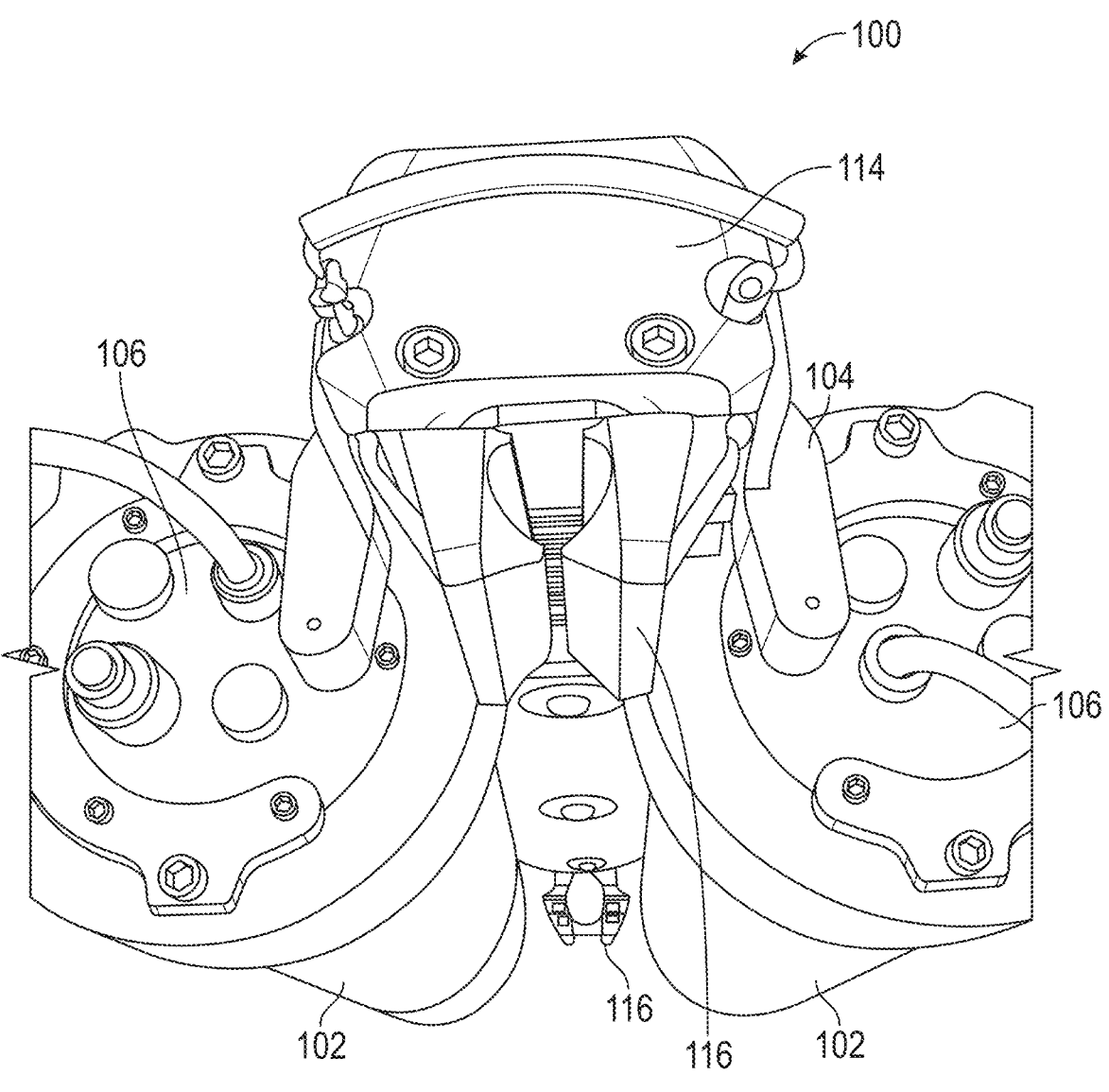
FIG. 8 is a perspective view of an embodiment of a seaweed seeder 100 showing the capture jaws 702 in the closed position.

FIG. 7 shows an embodiment of the seaweed seeder 100 that has the capture jaws 702 in the open position. FIG. 8 shows an embodiment of the seaweed seeder 100 that has the capture jaws 702 in the closed position.

The seaweed seeder 100 can have a wide variety of shapes. For example, the seaweed seeder 100 can include, but is not limited to: a cylindrical shape and an oblate spheroid shape. The seaweed seeder 100 can include a length, height, width, radius, first end, front side, second end, back side, right side, left side, top side, bottom side, outer surface, inner surface, and interior space.

The length of the seaweed seeder 100 can vary widely. For example, the length of the seaweed seeder 100 can be from a low of about 1.0 cm, about 2.0 cm, or about 5.0 cm, to a high of about 20.0 cm, about 50.0 cm, or about 100.0 cm. In another example, the length of the seaweed seeder 100 can be from about 1.0 cm to about 100.0 cm, about 2.0 cm to about 11.0 cm, about 2.0 cm to about 50.0 cm, about 3.0 cm to about 10.0 cm, about 5.0 cm to about 20.0 cm, 5.0 cm to about 75.0 cm, about 5.0 cm to about 30.0 cm, about 10.0 cm to about 75.0 cm, or about 15.0 cm to about 90.0 cm.

The height of the seaweed seeder 100 can vary widely. For example, the height of the seaweed seeder 100 can be from a low of about 1.0 cm, about 2.0 cm, or about 5.0 cm, to a high of about 20.0 cm, about 50.0 cm, or about 100.0 cm. In another example, the height of the seaweed seeder 100 can be from about 1.0 cm to about 100.0 cm, about 2.0 cm to about 11.0 cm, about 2.0 cm to about 50.0 cm, about 3.0 cm to about 10.0 cm, about 5.0 cm to about 20.0 cm, 5.0 cm to about 75.0 cm, about 5.0 cm to about 30.0 cm, about 10.0 cm to about 75.0 cm, or about 15.0 cm to about 90.0 cm.

The width of the seaweed seeder 100 can vary widely. For example, the width of the seaweed seeder 100 can be from a low of about 1.0 cm, about 2.0 cm, or about 5.0 cm, to a high of about 20.0 cm, about 50.0 cm, or about 100.0 cm. In another example, the width of the seaweed seeder 100 can be from about 1.0 cm to about 100.0 cm, about 2.0 cm to about 11.0 cm, about 2.0 cm to about 50.0 cm, about 3.0 cm to about 10.0 cm, about 5.0 cm to about 20.0 cm, 5.0 cm to about 75.0 cm, about 5.0 cm to about 30.0 cm, about 10.0 cm to about 75.0 cm, or about 15.0 cm to about 90.0 cm.

The weight of the seaweed seeder 100 can vary widely. For example, the weight of the seaweed seeder 100 can be from a low of about 0.5 kg, about 1.0 kg, or about 2.0 kg, to a high of about 10.0 kg, about 20.0 kg, or about 50.0 kg. In another example, the weight of the seaweed seeder 100 can be from about 0.5 kg to about 50.0 kg, about 4.0 kg to about 15.0 kg, about 5.0 kg to about 30.0 kg, or about 10.0 kg to about 50.0 kg.

The one or more brackets 104 can have a wide variety of shapes. For example, the bracket 104 can include, but is not limited to: a T shape, I shape, cylindrical shape, oblate spheroid shape, and combinations thereof. The bracket 104 can include a length, height, width, radius, first end, front side, second end, back side, right side, left side, top side, bottom side, outer surface, inner surface, and interior space. The bracket 104 can be used to secure the configuration of the one or more main housings 202 and/or the one or grow-line guides 302 and/or the one or more thrusters. The brackets 104 can be connected to and/or integrally formed with one or more of the cap member 106, main housing 202, spool member 102, seed spool 604, motor 108, propeller 110, and grow-line guide 302. In some embodiments, the bracket 104 can be positioned near a first end of the main housing. In some embodiments, the bracket 104 can be positioned near the middle of the main housing 202.

The one or more main housing 202 can include, but is not limited to: a first main housing, a second main housing, a third main housing, a fourth main housing, a fifth main housing, a six main housing, and more main housing. The main housings 202 can include, but are not limited to: one or more openings, one or more outer surfaces, one or more inner surfaces, one or more interior spaces, one or more caps, and one or more clips. The main housing 202 can include a groove and/or a recess on its outer surface. The groove and/or recess of the main housing 202 can provide a position and/or guide for the grow-line 608 to moveably attach to the seaweed seeder 100.

The one or more main housings 202 can have a wide variety of shapes. For example, the main housings 202 can include, but is not limited to: a cylindrical shape and an oblate spheroid shape. In another example, the main housing 202 can include a cylindrical shape with a first open end and a second open end. The main housing 202 can include a length, height, width, radius, first end, front side, second end, back side, right side, left side, top side, bottom side, outer surface, inner surface, and interior space. The one or more cap members 106 can be connected to and/or integrally formed with the first end and the second end of the main housing 202 to form a watertight interior space.

The length of the main housing 202 can vary widely. For example, the length of the main housing 202 can be from a low of about 1.0 cm, about 2.0 cm, or about 5.0 cm, to a high of about 20.0 cm, about 50.0 cm, or about 100.0 cm. In another example, the length of the main housing 202 can be from about 1.0 cm to about 100.0 cm, about 2.0 cm to about 11.0 cm, about 2.0 cm to about 50.0 cm, about 3.0 cm to about 10.0 cm, about 5.0 cm to about 20.0 cm, 5.0 cm to about 75.0 cm, about 5.0 cm to about 30.0 cm, about 10.0 cm to about 75.0 cm, or about 15.0 cm to about 90.0 cm.

The height of the main housing 202 can vary widely. For example, the height of main housing 202 can be from a low of about 1.0 cm, about 2.0 cm, or about 5.0 cm, to a high of about 20.0 cm, about 50.0 cm, or about 100.0 cm. In another example, the height of the main housing 202 can be from about 1.0 cm to about 100.0 cm, about 2.0 cm to about 11.0 cm, about 2.0 cm to about 50.0 cm, about 3.0 cm to about 10.0 cm, about 5.0 cm to about 20.0 cm, 5.0 cm to about 75.0 cm, about 5.0 cm to about 30.0 cm, about 10.0 cm to about 75.0 cm, or about 15.0 cm to about 90.0 cm.

The width of the main housing 202 can vary widely. For example, the width of the main housing 202 can be from a low of about 1.0 cm, about 2.0 cm, or about 5.0 cm, to a high of about 20.0 cm, about 50.0 cm, or about 100.0 cm. In another example, the width of the main housing 202 can be from about 1.0 cm to about 100.0 cm, about 2.0 cm to about 11.0 cm, about 2.0 cm to about 50.0 cm, about 3.0 cm to about 10.0 cm, about 5.0 cm to about 20.0 cm, 5.0 cm to about 75.0 cm, about 5.0 cm to about 30.0 cm, about 10.0 cm to about 75.0 cm, or about 15.0 cm to about 90.0 cm.

The radius of the main housing 202 can vary widely. For example, the radius of the main housing 202 can be from a low of about 1.0 cm, about 2.0 cm, or about 5.0 cm, to a high of about 20.0 cm, about 50.0 cm, or about 100.0 cm. In another example, the radius of the main housing 202 can be from about 1.0 cm to about 100.0 cm, about 2.0 cm to about 11.0 cm, about 2.0 cm to about 50.0 cm, about 3.0 cm to about 10.0 cm, about 5.0 cm to about 20.0 cm, 5.0 cm to about 75.0 cm, about 5.0 cm to about 30.0 cm, about 10.0 cm to about 75.0 cm, or about 15.0 cm to about 90.0 cm.

The weight of the main housing 202 can vary widely. For example, the weight of the main housing 202 can be from a low of about 0.5 kg, about 1.0 kg, or about 2.0 kg, to a high of about 10.0 kg, about 20.0 kg, or about 50.0 kg. In another example, the weight of the main housing 202 can be from about 0.5 kg to about 50.0 kg, about 4.0 kg to about 15.0 kg, about 5.0 kg to about 30.0 kg, or about 10.0 kg to about 50.0 kg.

Embodiments with two or more main housings 202 can form an angle between the lengths of the each of the main housings 202 when viewed orthogonally from the top of the seaweed seeder 100 or when viewed orthogonally from the side of the seaweed seeder 100. For example, embodiments with a first main housing 202 and a second main housing 202 can form an angle between the lengths of the first main housing 202 and second main housing 202 when viewed orthogonally from the top of the seaweed seeder 100 or when viewed orthogonally from the side of the seaweed seeder 100. In another example, two or more main housing 202 can form an angle between the lengths of the each of the main housings 202 can be from a small of about 0°, about 0.1°, or about 1°, to a large of about 180°, about 333°, or about 360°. In another example, two or more main housing 202 can form an angle between the lengths of the each of the main housings 202 can be from a small about 0° to about 360°, about 0° to about 180°, about 0.1° to about 359.9°, about 0.1° to about 179.9°, about 2° to about 34°, about 5° to about 10°, about 170° to about 179°, about 3° to about 45°, about 8° to about 25°, or about 7° to about 43°, about 150° to about 180°, about 150° to about 166°, about 4° to about 266°, about 180° to about 350°, or about 190° to about 358°. An angle of about 0° between the axis of rotation of the propeller and the length of the main housing 202 means that the thrust of the propeller would be in the same direction as the front end of the main housing. An angle of about 180° between the axis of rotation of the propeller and the length of the main housing 202 means that the thrust of the propeller would be in the same direction as the back end of the main housing. In some embodiments, the one or more main housings 202 can include the main housings 202 being configured so lengths of the main housing 202 are parallel to each other.

The one or more seed spools 102 can include, but are not limited to: a first seed spool, a second seed spool, a third seed spool, a fourth seed spool, a fifth seed spool, a six seed spool, and more seed spool. The seed spools 102 can have a wide variety of shapes. For example, seed spools 102 can include, but is not limited to: a cylindrical shape and an oblate spheroid shape. In another example, the seed spools 102 can include a cylindrical shape with a first open end and a second open end. The seed spools 102 can include a length, height, width, radius, first end, front side, second end, back side, right side, left side, top side, bottom side, outer surface, inner surface, and interior space. In some embodiments, the seed spools 102 can be connected to and/or integrally formed with one or more of the brackets 104, main housing 202, the cap members 106. The seed spools 102 can provide a place to attach a seed spool. The seed spools 102 can allow the attached seed spool 102 to freely rotate, allowing the seed-line 606 to unwrap itself from the seed spool 102 as the seaweed seeder 100 traverses the grow-line. The seed spool 102 can include the seed-line 606 to be wound around it, which can then be unwound around the grow-line 608 when the seaweed seeder 100 is in operation. In some embodiments, the main housing 202 can be used as a seed spool 102.

The length of the seed spools 102 can vary widely. For example, the length of the seed spools 102 can be from a low of about 1.0 cm, about 2.0 cm, or about 5.0 cm, to a high of about 20.0 cm, about 50.0 cm, or about 100.0 cm. In another example, the length of the spool member 102 can be from about 1.0 cm to about 100.0 cm, about 2.0 cm to about 11.0 cm, about 2.0 cm to about 50.0 cm, about 3.0 cm to about 10.0 cm, about 5.0 cm to about 20.0 cm, 5.0 cm to about 75.0 cm, about 5.0 cm to about 30.0 cm, about 10.0 cm to about 75.0 cm, or about 15.0 cm to about 90.0 cm.

The height of the seed spools 102 can vary widely. For example, the height of spool member 102 can be from a low of about 1.0 cm, about 2.0 cm, or about 5.0 cm, to a high of about 20.0 cm, about 50.0 cm, or about 100.0 cm. In another example, the height of the seed spools 102 can be from about 1.0 cm to about 100.0 cm, about 2.0 cm to about 11.0 cm, about 2.0 cm to about 50.0 cm, about 3.0 cm to about 10.0 cm, about 5.0 cm to about 20.0 cm, 5.0 cm to about 75.0 cm, about 5.0 cm to about 30.0 cm, about 10.0 cm to about 75.0 cm, or about 15.0 cm to about 90.0 cm.

The width of the seed spools 102 can vary widely. For example, the width of the seed spools 102 can be from a low of about 1.0 cm, about 2.0 cm, or about 5.0 cm, to a high of about 20.0 cm, about 50.0 cm, or about 100.0 cm. In another example, the width of the spool member 102 can be from about 1.0 cm to about 100.0 cm, about 2.0 cm to about 11.0 cm, about 2.0 cm to about 50.0 cm, about 3.0 cm to about 10.0 cm, about 5.0 cm to about 20.0 cm, 5.0 cm to about 75.0 cm, about 5.0 cm to about 30.0 cm, about 10.0 cm to about 75.0 cm, or about 15.0 cm to about 90.0 cm.

The radius of the seed spools 102 can vary widely. For example, the radius of the seed spools 102 can be from a low of about 1.0 cm, about 2.0 cm, or about 5.0 cm, to a high of about 20.0 cm, about 50.0 cm, or about 100.0 cm. In another example, the radius of the spool member 102 can be from about 1.0 cm to about 100.0 cm, about 2.0 cm to about 11.0 cm, about 2.0 cm to about 50.0 cm, about 3.0 cm to about 10.0 cm, about 5.0 cm to about 20.0 cm, 5.0 cm to about 75.0 cm, about 5.0 cm to about 30.0 cm, about 10.0 cm to about 75.0 cm, or about 15.0 cm to about 90.0 cm.

The weight of the seed spools 102 can vary widely. For example, the weight of seed spools 102 can be from a low of about 0.5 kg, about 1.0 kg, or about 2.0 kg, to a high of about 10.0 kg, about 20.0 kg, or about 50.0 kg. In another example, the weight of the seed spools 102 can be from about 0.5 kg to about 50.0 kg, about 4.0 kg to about 15.0 kg, about 5.0 kg to about 30.0 kg, or about 10.0 kg to about 50.0 kg.

The one or more handles 112 can have a wide variety of shapes. The handle can include a U-shape, connecting to the seaweed seeder 100 at two locations. The one or more handles 112 can include, but are not limited to: a first handle, a second handle, a third handle, a fourth handle, a fifth handle, a six handle, and more handles. The handle 112 can include, but is not limited to: a length, height, width, radius, first end, front side, second end, back side, right side, left side, top side, bottom side, outer surface, inner surface, and interior space.

The one or more handles 112 can be connected to and/or integrally formed with the one or more main housing 202 and/or the one or more brackets 104 and/or the one or more grow-line guides. The handle can include a U-shape, connecting to the seaweed seeder 100 at two locations.

The one or more grow-line guide 302 can include, but is not limited to: a first grow-line guide, a second grow-line guide, a third grow-line guide, a fourth grow-line guide, a fifth grow-line guide, a six grow-line guide, and more grow-line guides. The grow-line guide 302 can include, but is not limited to: a length, height, width, radius, first end, front side, second end, back side, right side, left side, top side, bottom side, outer surface, inner surface, and interior space. The grow-line guides 302 can be connected to and/or integrally formed with the one or more sides of the main housing 202.

In some embodiments, the motors 108 can drive the one or more propellers 110, one or more thrusters, or combinations thereof. In some embodiments, the motors 108 can propel the seaweed seeder 100 along the grow-line 608 depositing the seed-line. In some embodiments, the thrusters or propellers 110 can be angled to provide both forward and rotary motion to evenly wrap seed-line 606 along the length of the grow-line. For example, the propellers 110 can include an axis of rotation of the propeller blades. In some embodiments, the axis of rotation of the propeller and the length of the main housing 202 can form an angle. In another embodiment, the axis of rotation of the propeller 110 and the length of the main housing 202 can form an angle when viewed orthogonally from the top of the seaweed seeder 100. The angle of the axis of rotation of the propeller 110 and the length of the main housing 202 can vary widely. For example, the angle of the axis of rotation of the propeller 110 and the length of the main housing 202 can be from a small of about 0°, about 0.1°, or about 1°, to a large of about 180°, about 333°, or about 360°. In another example, the angle of the axis of rotation of the propeller 110 and the length of the main housing 202 can be about 0° to about 360°, about 0° to about 180°, about 0.1° to about 359.9°, about 0.1° to about 179.9°, about 2° to about 34°, about 5° to about 10°, about 170° to about 179°, about 3° to about 45°, about 8° to about 25°, or about 7° to about 43°, about 150° to about 180°, about 150° to about 166°, about 4° to about 266°, about 180° to about 350°, or about 190° to about 358°. An angle of about 0° between the axis of rotation of the propeller 110 and the length of the main housing 202 means that the thrust of the propeller would be in the same direction as the front end of the main housing. An angle of about 180° between the axis of rotation of the propeller 110 and the length of the main housing 202 means that the thrust of the propeller would be in the same direction as the back end of the main housing 202. The propeller 110 can include, but is not limited to: one blade, two blades, three blades, four blades, or more blades. In alternative embodiments, non-propeller propulsors may be used.

The one or more electronic controllers 306 can include, but are not limited to: one or more processors, one or more transmitters, and one or more receivers. The one or more electronic controllers 306 can be in electronic communication with the batteries, thrusters, sensors, and switches. For example, the electronic controllers 306 can be used to control the speed and the direction of the thrusters, which propel the seaweed seeder 100 along the grow-line. The one or more electronic controllers 306 can receive an input signal from one or more of the switch, sensor, measuring a process variable. For example, the electronic controller 306 can receive a signal from a switch to engage the thrusters. In another example, the electronic controller 306 can compare a measured process variable with a predetermined set point value and determine the appropriate amount of output signal. The electronic controller 306 can be in a control loop with a sensor. The one or more sensors can include, but are not limited to: temperature sensors, water flow sensors, position sensors, gyroscopes, and magnetometers. The one or more wires can be used to electronically connect the motor 108, actuator 114, batteries, sensors, and switches.

The one or more battery housings 304 can include, but are not limited to: a first battery housing, a second battery housing, a third battery housing, a fourth battery housing, a fifth battery housing, a six battery housing, and more battery housing. The battery housing 304 can include, but is not limited to: a length, height, width, radius, first end, front side, second end, back side, right side, left side, top side, bottom side, outer surface, inner surface, and interior space. The battery housing 304 can be positioned in the interior space of the main housing. The battery housing 304 can be fastened to the inner surface of the main housing 202.

The one or more batteries can include, but are not limited: a first battery, a second battery, a third battery, a fourth battery, a fifth battery, a six battery, and more battery. The batteries can be inserted into the battery housing. The one or more batteries can be in electronic communication with electronic controllers, sensors, and thrusters. The batteries can include sizes and voltages of batteries that vary widely. For example, the battery can include about 1.2 V, about 1.5 V, about 3 V, about 3.7 V, about 6 V, about 9 V, or about 12.7 V. The batteries can include lithium batteries. The batteries can include rechargeable batteries.

The one or more actuators 114 can include a wide variety of shapes. The one or more actuators 114 can include, but are not limited: a first actuators, a second actuators, a third actuators, a fourth actuators, a more actuators. In some embodiments, actuators 114 can deactivate the one or more motors 108 by being triggered by a perpendicular supporting structure on the grow-line.

The one or more switches can include, but is not limited to: a waterproof switch. The one or more switches can include, but are not limited: a first switch, a second switch, a third switch, a fourth switch, a more switches. In some embodiments, a first switch can be used to activate and/or deactivate the one or more motors 108 by the user. In some embodiments, the activation and/or deactivation can also occur via remote control or through software programming.

The one or more attaching members 116 can include a wide variety of shapes. The attaching members 116 can include, but is not limited to, a C shape. The attaching member can include, but is not limited to: capture jaws 702, jaws, clips, clamps, and combinations thereof. The one or more attaching members 116 can include a first attaching member, a second attaching member, a third attaching member, a fourth attaching member, a fifth attaching member, a sixth attaching member, and more attaching members. The attaching member 116 can include, but is not limited to: a length, height, width, radius, first end, front side, second end, back side, right side, left side, top side, bottom side, outer surface, inner surface, and interior space. The attaching member 116 can moveably attach the seaweed seeder 100 to the grow-line 608 so the seaweed seeder 100 can travel along the grow-line. In some embodiments, the attaching member 116 can include capture jaws 702. In some embodiments, the capture jaws 702 can be configured into one or more positions. For example, the capture jaws 702 can include an open position that can release the seaweed seeder 100 from the grow-line 608 and a closed position that can attach the seaweed seeder 100 from the grow-line 608. The attaching member 116 can be connected to and/or integrally formed with one or more of the brackets 104, cap members 106, main housings 202, and grow-line guides 302.

The one or more pins 602 can moveably attach the seaweed seeder 100 to the grow-line 608 so the seaweed seeder 100 can travel along the grow-line. The pin 602 can be connected to and/or integrally formed with one or more of the brackets 104, main housings 202, and grow-line guides. The pin 602 can include, but is not limited to, a cylindrical shape. In some embodiments, a pin 602 can be inserted through openings of the main housing, moveably securing the grow-line 608 against the main housing 202.

The one or more grow-lines 608 can include, but are not limited to: a string of natural fibers or a string of synthetic fibers. The grow-lines 608 can be distributed and suspended throughout a seaweed farm. In some embodiments, the seaweed seeder 100 can be moveably attached to the grow-line 608 and propel itself along the grow-line 608, unspooling the seed-line 606 around the grow-line 608.

The one or more spool members 604 can include a wide variety of shapes. For example, the one or more spool members 604 can include, but are not limited to: a cylindrical shape, spherical shape, or combination thereof. The one or more spool members 604 can include, but are not limited to: a first seed spool, a second seed spool, a third seed spool, a fourth seed spool, a fifth seed spool, a six seed spool, and more seed spools. The spool member 604 can include, but is not limited to: a length, height, width, radius, front side, back side, right side, left side, top side, bottom side, outer surface, inner surface, and interior space. In some embodiments, the spool member 604 can be connected to and/or integrally formed with the one or more main housings, one or more brackets, and one or more caps. In some embodiments, the main housing 202 can be used as a seed spool. In some embodiments, the seed spool 102 can be connected to and/or integrally formed with the one or more main housings, one or more brackets, and one or more caps. The spool member 604 can include the seed-line 606 to be wound around it, which can then be unwound around the grow-line 608 when the seaweed seeder 100 is in operation.

The spool member 604 can include, but is not limited to: a length, height, width, radius, front side, back side, right side, left side, top side, bottom side, outer surface, inner surface, and interior space. The spool member 604 can be connected to and/or integrally formed with the one or more main housings, one or more brackets, and one or more caps. The spool member 604 can provide a place to attach a seed spool. The spool member 604 can allow the attached seed spool 102 to freely rotate, allowing the seed-line 606 to unwrap itself from the seed spool 102 as the seaweed seeder 100 traverses the grow-line. In some embodiments, the main housing 202 can be used as a spool member 604.

The length of the spool member 604 can vary widely. For example, the length of the spool member 102 can be from a low of about 1.0 cm, about 2.0 cm, or about 5.0 cm, to a high of about 20.0 cm, about 50.0 cm, or about 100.0 cm. In another example, the length of the spool member 102 can be from about 1.0 cm to about 100.0 cm, about 2.0 cm to about 11.0 cm, about 2.0 cm to about 50.0 cm, about 3.0 cm to about 10.0 cm, about 5.0 cm to about 20.0 cm, 5.0 cm to about 75.0 cm, about 5.0 cm to about 30.0 cm, about 10.0 cm to about 75.0 cm, or about 15.0 cm to about 90.0 cm.

The height of the spool member 604 can vary widely. For example, the height of spool member 604 can be from a low of about 1.0 cm, about 2.0 cm, or about 5.0 cm, to a high of about 20.0 cm, about 50.0 cm, or about 100.0 cm. In another example, the height of the spool member 604 can be from about 1.0 cm to about 100.0 cm, about 2.0 cm to about 11.0 cm, about 2.0 cm to about 50.0 cm, about 3.0 cm to about 10.0 cm, about 5.0 cm to about 20.0 cm, 5.0 cm to about 75.0 cm, about 5.0 cm to about 30.0 cm, about 10.0 cm to about 75.0 cm, or about 15.0 cm to about 90.0 cm.

The width of the spool member 604 can vary widely. For example, the width of the spool member 604 can be from a low of about 1.0 cm, about 2.0 cm, or about 5.0 cm, to a high of about 20.0 cm, about 50.0 cm, or about 100.0 cm. In another example, the width of the spool member 102 can be from about 1.0 cm to about 100.0 cm, about 2.0 cm to about 11.0 cm, about 2.0 cm to about 50.0 cm, about 3.0 cm to about 10.0 cm, about 5.0 cm to about 20.0 cm, 5.0 cm to about 75.0 cm, about 5.0 cm to about 30.0 cm, about 10.0 cm to about 75.0 cm, or about 15.0 cm to about 90.0 cm.

The radius of the spool member 604 can vary widely. For example, the radius of the spool member 604 can be from a low of about 1.0 cm, about 2.0 cm, or about 5.0 cm, to a high of about 20.0 cm, about 50.0 cm, or about 100.0 cm. In another example, the radius of the spool member 604 can be from about 1.0 cm to about 100.0 cm, about 2.0 cm to about 11.0 cm, about 2.0 cm to about 50.0 cm, about 3.0 cm to about 10.0 cm, about 5.0 cm to about 20.0 cm, 5.0 cm to about 75.0 cm, about 5.0 cm to about 30.0 cm, about 10.0 cm to about 75.0 cm, or about 15.0 cm to about 90.0 cm.

The seaweed seeder 100 can be used to seed a wide variety of seaweed seeds. For example, the seaweed seeder 100 can be used to seed kelp, juvenile kelp, sugar kelp, *Saccharina latissima*, ribbon kelp, and *Alaria marginate*.

The methods of using a seaweed seeder 100 can include, but are not limited to: attaching a seaweed seeder 100 to a grow-line 608, activating and/or engaging the propeller to propel the seaweed seeder 100 along the grow-line 608. In some embodiments, the seaweed seeder 100 can deliver a payload of two seed-line 606 spools (about 125 m) that are loaded on the seaweed seeder 100. Then, the seaweed seeder 100 can be moveably attached to the grow-line 608 with the attaching member 116, such that the grow-line 608 does not need to be threaded through the seed-spool and the grow-line 608 structure of the seaweed farm does not need to be disassembled for each grow-line. Once attached to the grow-line 608, the free end of the seed-line 606 can be tied-off or fixed and the propellers or thrusters can be activated by a switch. When the seaweed seeder 100 reaches the end of the grow-line, a kill-switch can be triggered by a perpendicular supporting structure of the grow-line, deactivating the thrusters. The user can then detach the seaweed seeder 100 from the seeded grow-line 608 by unclipping the clips and/or removing the pin. The user can then attach to the next unseeded grow-line 608 and activate the seaweed seeder 100 in the reverse direction until the entire seaweed farm is seeded. Multiple seaweed seeders can be used at the same time to further increase efficiency of the seaweed farm seeding process.

In some embodiments, a user can clip the seaweed seeder 100 onto an installed grow-line, attaches the free end of the seed string and activates the thrusters with a power switch. The seeder then uses two thrusters to propel itself down the grow-line 608 while rotating to evenly apply seed string at a specified number of wraps per distance traveled. Upon reaching the transverse headrope at the end of the grow-line, the power switch is triggered, and the thrusters automatically stop. The second of two seed spools 102 can be attached to the next grow-line, and the seeder can be sent back, seeding along the way.

In some embodiments, the seaweed seeder 100 can have a velocity of travel down the grow-line 608 that can vary widely. For example, the seaweed seeder 100 can have a velocity of travel down the grow-line 608 from a slow of about 1 cm/s, about 2 cm/s, or about 5 cm/s, to a fast of about 20 cm/s, about 100 cm/s, or about 1,000 cm/s. In another example, the seaweed seeder 100 can have a velocity of travel down the grow-line 608 from about 1 cm/s to about 2 cm/s, about 1 cm/s to about 1,000 cm/s, about 5 cm/s to about 20 cm/s, about 10 cm/s to about 22 cm/s, or about 20 cm/s to about 500 cm/s. In another embodiment, the seaweed seeder 100 can have a velocity of about 500 cm per minute.

In some embodiments, the seaweed seeder 100 can provide a wrap of seed-line 606 per meter of grow line that can vary widely. For example, seaweed seeder 100 can provide a wrap of seed-line 606 per meter of grow line from a low of about 1 wrap of seed-line 606 per meter of grow line, about 2 wraps of seed-line 606 per meter of grow line, or about 3 wraps of seed-line 606 per meter of grow line, to a high of about 10 wraps of seed-line 606 per meter of grow line, 50 wraps of seed-line 606 per meter of grow line, or about 100 wraps of seed-line 606 per meter of grow line. In another example, the seaweed seeder 100 can provide a wrap of seed-line 606 per meter of grow line from about 1 wrap of seed-line 606 per meter of grow line to about wraps of seed-line 606 per meter of grow line, about 2 wraps of seed-line 606 per meter of grow line to about 10 wraps of seed-line 606 per meter of grow line, about 3 wraps of seed-line 606 per meter of grow line to about 20 wraps of seed-line 606 per meter of grow line. In another embodiment, a seaweed seeder can provide one wrap of seed-line 606 per foot. In another embodiment, the seaweed seeder can wrap a seed-line 606 around grow line in a clockwise manner and/or a counter-clockwise manner.

Embodiments of the present disclosure further relate to any one or more of the following paragraphs:

1. A seaweed seeder comprising: a bracket; at least one cap member, wherein the at least one cap member is connected to the bracket; at least one motor, at least one propeller, wherein the at least one propeller is connected to the at least one motor; at least one main housing, wherein the at least one main housing comprises a length, an outer surface, an inner surface, and an interior space, and wherein the at least one main housing is connected to the at least one cap member; at least one electronic controller, wherein the at least one electronic controller is positioned in the interior space of the main housing, wherein at least one electronic controller is in electronic communication with the at least at least one motor; and an attaching member.

2. The seaweed according to paragraph 1, further comprising: a battery housing, wherein the battery housing is positioned in the interior space of the main housing.

3. The seaweed seeder according to paragraph 1 or 2, further comprising: an auto-stop actuator.

4. The seaweed seeder according to any one of paragraphs 1, 2, and 3, further comprising: a grow-line guide.

5. The seaweed seeder according to any one of paragraphs 1, 2, 3, and 4, wherein a first propeller, wherein the first propeller is positioned on the outer surface of the cap member, wherein the first propeller has an axis of rotation, wherein the axis of rotation of the first propeller and the length of the main housing forms an angle, and wherein the angle between the axis of rotation of the first propeller and the length of the main housing is from about 2° to about 34°.

6. The seaweed seeder according to any one of paragraphs 1, 2, 3, 4, and 5, wherein the seaweed seeder has two main housings, two cap members, two motors, two electronic controllers, and two propellers.

7. The seaweed seeder according to any one of paragraphs 1, 2, 3, 4, 5, and 6, further comprising a second propeller, wherein the second propeller is positioned on the outer surface of the main housing, wherein the second propeller has an axis of rotation, wherein the axis of rotation of the second propeller and the length of the main housing forms an angle, and wherein the angle between the axis of rotation of the second propeller and the length of the main housing is from about 0° to about 90°.

8. A method for using a seaweed seeder comprising: attaching a seaweed seeder to a grow-line, wherein the seaweed seeder comprises: a bracket; at least one cap member, wherein the at least one cap member is connected to the bracket; at least one motor, at least one propeller, wherein the at least one propeller is connected to the at least one motor; at least one main housing, wherein the at least one main housing comprises a length, an outer surface, an inner surface, and an interior space, and wherein the at least one main housing is connected to the at least one cap member; at least one electronic controller, wherein the at least one electronic controller is positioned in the interior space of the main housing, wherein at least one electronic controller is in electronic communication with the at least at least one motor; and an attaching member; and activating the at least one motor to engage the at least one propeller to move seaweed seeder along the grow-line.

9. The method for using a seaweed seeder according to paragraph 8, further comprising: a battery housing, wherein the battery housing is positioned in the interior space of the main housing.

10. The method for using a seaweed seeder according to paragraph 8 or 9, further comprising: an auto-stop actuators.

11. The method for using a seaweed seeder according to any one of paragraphs 8, 9, and 10, wherein a first propeller, wherein the first propeller is positioned on the outer surface of the cap member, wherein the first propeller has an axis of rotation, wherein the axis of rotation of the first propeller and the length of the main housing forms an angle, and wherein the angle between the axis of rotation of the first propeller and the length of the main housing is from about 2° to about 34°.

12. The method for using a seaweed seeder according to any one of paragraphs 8, 9, 10, and 11, and wherein the seaweed seeder has two main housings, two cap members, two motors, two electronic controllers, and two propellers.

13. The method for using a seaweed seeder according to any one of paragraphs 8, 9, 10, 11, and 12, further comprising a second propeller, wherein the second propeller is positioned on the outer surface of the main housing, wherein the second propeller has an axis of rotation, wherein the axis of rotation of the second propeller and the length of the main housing forms an angle, and wherein the angle between the axis of rotation of the second propeller and the length of the main housing is from about 0° to about 90°.

14. The method for using a seaweed seeder according to any one of paragraphs 8, 9, 10, 11, 12, and 13, wherein the method provides about 3 wraps of seed-line per meter of grow line to about 20 wraps of seed-line per meter of grow line.

15. The method for using a seaweed seeder according to any one of paragraphs 8, 9, 10, 11, 12, 13, and 14, wherein the activating the propeller to propel the seaweed seeder along the grow-line provides the seaweed seeder with a velocity of from about 5 cm/s to about 20 cm/s.

One of ordinary skill in the art will readily appreciate that alternate but functionally equivalent components, materials, designs, and equipment may be used. The inclusion of additional elements may be deemed readily apparent and obvious to one of ordinary skill in the art. Specific elements disclosed herein are not to be interpreted as limiting, but rather as a basis for the claims and as a representative basis for teaching one of ordinary skill in the art to employ the present invention. Furthermore, all patents, test procedures, and other documents cited in this application are fully incorporated by reference to the extent such disclosure is not inconsistent with this application.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. It should also be appreciated that the numerical limits may be the values from the examples. Certain lower limits, upper limits and ranges appear in at least one claims below. All numerical values are "about" or "approximately" the indicated value, and consider experimental error and variations that would be expected by a person having ordinary skill in the art.

Reference throughout this specification to "one embodiment," "an embodiment," or similar language means that a particular feature, structure, or characteristic described in connection with the embodiment is included in at least one embodiment. Thus, appearances of the phrases "in one embodiment," "In some embodiments," and similar language throughout this specification may, but do not necessarily, all refer to the same embodiment.

Although the invention has been described with reference to the above examples, it will be understood that modifications and variations are encompassed within the spirit and scope of the invention. Accordingly, the invention is limited only by the following claims.

What is claimed is:
1. A seaweed seeder comprising:
a bracket;

at least one cap member, wherein the at least one cap member is connected to the bracket;

at least one motor, at least one propeller, wherein the at least one propeller is connected to the at least one motor;

at least one main housing, wherein the at least one main housing comprises a length, an outer surface, an inner surface, and an interior space, and wherein the at least one main housing is connected to the at least one cap member;

at least one electronic controller, wherein the at least one electronic controller is positioned in the interior space of the main housing, wherein at least one electronic controller is in electronic communication with the at least at least one motor; and an attaching member.

2. The seaweed seeder according to claim 1, further comprising:

a battery housing, wherein the battery housing is positioned in the interior space of the main housing.

3. The seaweed seeder according to claim 1 or 2, further comprising:

an auto-stop actuator.

4. The seaweed seeder according to claim 1, further comprising:

a grow-line guide.

5. The seaweed seeder of claim 1 wherein said at least one propeller comprises a first propeller, wherein the first propeller is positioned on the outer surface of the cap member, wherein the first propeller has an axis of rotation, wherein the axis of rotation of the first propeller and the length of the main housing forms an angle, and wherein the angle between the axis of rotation of the first propeller and the length of the main housing is from about 2° to about 34°.

6. The seaweed seeder according to claim 1, wherein at seaweed seeder comprises two main housings, two cap members, two motors, two electronic controllers, and two propellers.

7. The seaweed seeder according to, of claim 1 wherein at least one propeller is positioned on the outer surface of the main housing, wherein said propeller has an axis of rotation, wherein the axis of rotation of said propeller and the length of the main housing forms an angle, and wherein the angle between the axis of rotation of the said propeller and the length of the main housing is from about 0° to about 90°.

8. A method for using a seaweed seeder comprising:

attaching a seaweed seeder to a grow-line, wherein the seaweed seeder comprises:

a bracket;

at least one cap member, wherein the at least one cap member is connected to the bracket;

at least one motor, at least one propeller, wherein the at least one propeller is connected to the at least one motor;

at least one main housing, wherein the at least one main housing comprises a length, an outer surface, an inner surface, and an interior space, and wherein the at least one main housing is connected to the at least one cap member;

at least one electronic controller, wherein the at least one electronic controller is positioned in the interior space of the main housing, wherein at least one electronic controller is in electronic communication with the at least at least one motor; and an attaching member; and activating the at least one motor to engage the at least one propeller to move seaweed seeder along the grow-line.

9. The method for using a seaweed seeder according to claim 8, further comprising:

a battery housing, wherein the battery housing is positioned in the interior space of the main housing.

10. The method for using a seaweed seeder according to claim 8, further comprising:

an auto-stop actuators.

11. The method for using a seaweed seeder according to any one of claims 8, 9, and 10, wherein said at least one propeller comprises a first propeller, wherein the first propeller is positioned on the outer surface of the cap member, wherein the first propeller has an axis of rotation, wherein the axis of rotation of the first propeller and the length of the main housing forms an angle, and wherein the angle between the axis of rotation of the first propeller and the length of the main housing is from about 2° to about 34°.

12. The method for using a seaweed seeder according to claim 11 and wherein the seaweed seeder has two main housings, two cap members, two motors, two electronic controllers, and two propellers.

13. The method for using a seaweed seeder according to claim 11 further comprising a second propeller, wherein the second propeller is positioned on the outer surface of the main housing, wherein the second propeller has an axis of rotation, wherein the axis of rotation of the second propeller and the length of the main housing forms an angle, and wherein the angle between the axis of rotation of the second propeller and the length of the main housing is from about 0° to about 90°.

14. The method for using a seaweed seeder according to claim 11, wherein the method provides about 3 wraps of seed-line per meter of grow line to about 20 wraps of seed-line per meter of grow line.

15. The method for using a seaweed seeder according to claim 11 wherein the activating the propeller to propel the seaweed seeder along the grow-line provides the seaweed seeder with a velocity of from about 5 cm/s to about 20 cm/s.

* * * * *